(12) United States Patent
Decker et al.

(10) Patent No.: US 12,355,852 B2
(45) Date of Patent: Jul. 8, 2025

(54) DATA SERVICE TRACKER MODULE FOR A COMMUNICATION SYSTEM AND METHOD OF DETERMINING A SET OF DATA COUPLINGS

(71) Applicant: GE AVIATION SYSTEMS LLC, Grand Rapids, MI (US)

(72) Inventors: Christian Reynolds Decker, Ada, MI (US); Matthew Louis Brasic, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 18/640,664

(22) Filed: Apr. 19, 2024

(65) Prior Publication Data
US 2024/0267436 A1    Aug. 8, 2024

Related U.S. Application Data

(63) Continuation of application No. 16/924,952, filed on Jul. 9, 2020, now abandoned.

(51) Int. Cl.
| | |
|---|---|
| *H04L 67/56* | (2022.01) |
| *H04L 9/40* | (2022.01) |
| *H04L 49/901* | (2022.01) |
| *H04L 67/12* | (2022.01) |

(52) U.S. Cl.
CPC ............ *H04L 67/56* (2022.05); *H04L 49/901* (2013.01); *H04L 63/10* (2013.01); *H04L 67/12* (2013.01)

(58) Field of Classification Search
CPC . H04L 43/106; H04L 49/901; H04L 63/0236; H04L 63/08; H04L 63/10; H04L 63/1408; H04L 67/12; H04L 67/56
See application file for complete search history.

(56) References Cited

U.S. PATENT DOCUMENTS

| | | | |
|---|---|---|---|
| 7,667,604 B2 | 2/2010 | Ebert et al. | |
| 7,737,857 B2 | 6/2010 | Ebert et al. | |
| 8,161,247 B2 | 4/2012 | Gray et al. | |
| 8,417,854 B2 | 4/2013 | Weng et al. | |
| 8,601,121 B2 | 12/2013 | Kumar et al. | |
| 9,112,875 B2 | 8/2015 | Zaid et al. | |
| 10,069,690 B2 | 9/2018 | Dragon et al. | |
| 10,929,842 B1* | 2/2021 | Arvanaghi | ............ H04L 9/3239 |
| 2012/0316700 A1* | 12/2012 | Mudiam | ................. H04L 67/12 |
| | | | 701/1 |
| 2014/0236394 A1* | 8/2014 | Kumar | .................... H04L 67/12 |
| | | | 701/3 |

(Continued)

FOREIGN PATENT DOCUMENTS

EP    3618400 A2    3/2020

*Primary Examiner* — Gil H. Lee
(74) *Attorney, Agent, or Firm* — McGarry Bair PC

(57) ABSTRACT

A data service tracker module and a method of determining a set of data couplings in a communication system, includes receiving a transaction communication from a communication mechanism the transaction communication defining access between a transaction source and a transaction destination, and recording the transaction communication data defining the data coupling, to define a set of data couplings authorized for transaction communications in the communication system.

20 Claims, 4 Drawing Sheets

(56) References Cited

U.S. PATENT DOCUMENTS

| | | | |
|---|---|---|---|
| 2014/0281321 A1* | 9/2014 | Carreno | G06F 21/57 |
| | | | 711/164 |
| 2014/0344912 A1* | 11/2014 | Chapman, II | H04L 63/1416 |
| | | | 726/11 |
| 2015/0029987 A1* | 1/2015 | Addepalli | H04W 52/12 |
| | | | 370/329 |
| 2017/0016792 A1* | 1/2017 | Shepherd | G01D 18/008 |
| 2017/0289189 A1 | 10/2017 | Bush et al. | |
| 2018/0113796 A1* | 4/2018 | Meyers | G06F 11/3684 |
| 2018/0324119 A1 | 11/2018 | Ahuja et al. | |
| 2020/0249125 A1* | 8/2020 | Pekovic | G05B 23/0256 |

* cited by examiner

DATA SERVICE TRACKER MODULE FOR A COMMUNICATION SYSTEM AND METHOD OF DETERMINING A SET OF DATA COUPLINGS

CROSS REFERENCE TO RELATED APPLICATION(S)

This application claims priority to and benefit of U.S. patent application Ser. No. 16/924,952, filed Jul. 9, 2020, which is incorporated herein in its entirety.

TECHNICAL FIELD

The disclosure relates to a method and apparatus for determining a set of data couplings between communication transaction pairs, and specifically, for determining a set of data couplings in response to the communication transactions.

BACKGROUND

For contemporary aircraft, an avionics 'platform' consists of a variety of elements such as sensors, sensor data concentrators, a data communications network, radio frequency sensors and communication equipment, computational elements, effectors, and graphical displays. These components must share information with each other over the data communications network. In these systems, data is sampled, published, and transmitted between publishers (e.g. data writers) and subscribers (e.g. data subscribers).

BRIEF DESCRIPTION

In one aspect, the present disclosure relates to a data service tracker module for an aircraft communication system, including an interface with a communication mechanism operable to receive regulated transaction communication data between a transaction source and a transaction destination of the aircraft communication system, and wherein the transaction destination having a shared memory defining a set of data stores, and a controller module configured to receive the regulated transaction communication data, identify transaction communication aspects of the transaction communication data, including at least the transaction source and at least one of the set of data stores of the shared memory, and build a set of data couplings of the aircraft communication system, each data coupling defines the transaction source and the at least one of the set of data stores of the shared memory.

In another aspect, the present disclosure relates to a data service tracker module for a testing an aircraft communication system, including an interface with a communication mechanism operable to receive regulated transaction communication data between a transaction source and a transaction destination of the communication system, and wherein the transaction destination having a shared memory defining a set of data stores, and a controller module configured to receive the regulated transaction communication data, identify transaction communication aspects of the transaction communication data, including at least the transaction source and at least one of the set of data stores of the shared memory, build a set of data couplings of the communication system, each data coupling defines the transaction source and the at least one of the set of data stores of the shared memory, and validate that the aircraft communication system is operating in accordance with a predetermined set of design criteria by way of comparing the built set of data couplings with a predetermined expected set of data couplings.

In yet another aspect, the present disclosure relates to a method of testing a set of data couplings in a regulated communication system for an aircraft, the method including receiving, during testing of the regulated communication system, by a data service tracker module, real-time transaction communications defining access between a transaction source and a transaction destination, the transaction destination having a shared memory defining a set of data stores, identifying aspects of the transaction communication, by the data service tracker module, to define transaction communication data defining a data coupling between the transaction source and at least one of the set of data stores of the shared memory, recording the transaction communication data defining the data coupling, by the data service tracker module, to define a set of data couplings authorized for transaction communications in the regulated communication system, comparing the defined set of data couplings with a predetermined expected set of data couplings, and determining, based on the comparison, that the regulated communication system is operating in accordance with a predetermined expected set of data couplings, wherein the transaction source and the transaction destination are within the regulated communication system.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present description, including the best mode thereof, directed to one of ordinary skill in the art, is set forth in the specification, which makes reference to the appended FIGS., in which.

DETAILED DESCRIPTION

Figure 1:
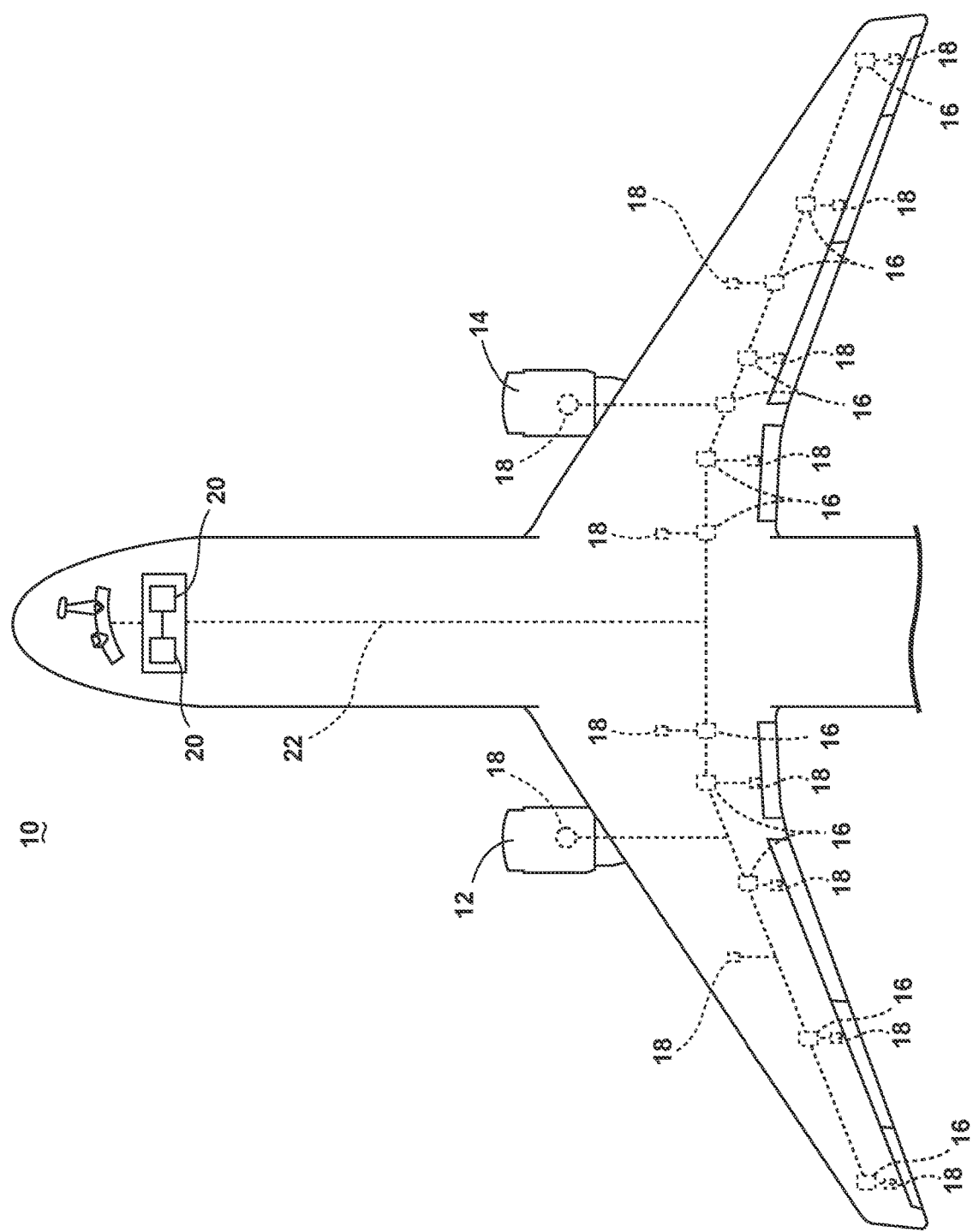
FIG. 1 is a top down schematic view of the aircraft and communications network in accordance with various aspects described herein.

Aspects of the disclosure are illustrated in the environment of aircraft having a data network interconnecting common or shared memory accessible to a plurality of sensors, systems, and components of the aircraft. However, aspects of the disclosure can be implemented in any environment using readers and writers of the data accessing or access by way of the common or shared memory, including within a single system, partition, operable component, line replaceable unit (LRU), or the like. As used herein, terms like "reader," "writer," or "client" can denote a remote relationship with the shared memory or data store (e.g. another separated entity), while a "server" can denote a like relationship with the shared memory or data store. Furthermore, a "reader" entity of the shared memory can denote an entity that has "access" to the shared memory data to read, view, or otherwise receiving data from a shared memory data store. In contrast to a "reader," a "writer" entity can include availability or authorization to commit a change to a memory location, the change being storing or overwriting data, values, commands, instructions, or any other data, element, or identifier to a memory location, regardless of the function performed by the data, element, or identifier, or regardless of the function or implementation of the environment, apparatus, system, or method. In one non-limiting example, the authorization to edit the data for a writer entity can be limited only to a particular subset of the shared memory. In another non-limiting example, a single entity can have both "reader" or "read" access to a first subset of shared memory data, and have "writer" or "write" access to a second subset of shared memory data. In yet another non-limiting example, a single entity can have overlapping "read" or "write" access to shared memory data.

As used herein, a "regulated" system is a system having restrictions on access, such as write-access to data or values of the system, whereby only approved or authorized entities, parties, functions, or the like, are enabled or otherwise allowed to access the regulated or restricted elements. In one non-limiting example, only a single authorized function can have write access to a specific data element.

While "a set of" various elements will be described, it will be understood that "a set" can include any number of the respective elements, including only one element. Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Connection references (e.g., attached, coupled, connected, and joined) are to be construed broadly and can include intermediate members between a collection of elements and relative movement between elements unless otherwise indicated. In certain communicative instances, connection references can be construed to describe entities or elements that are communicatively connected, including by way of intermediary communications or communicative mediums. Communicative instance can include, but are not limited to, software module interaction, read and write access of memory data, or the like. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

As used herein, a "data store" can include a data value stored in a memory, wherein the data value is only write-accessible by one or more functions, programs, processes, entities, or the like (a "writer"). The write-accessibility of the data store can be policed or otherwise regulated by digital security mechanisms understood by those skilled in the art. While only limited subset of writers has write-access to the data store, a data store can have or include multiple function, program, processes, or entities having read-access to read, view, or otherwise receive the data in a unidirectional relationship. In contrast with the data store, a "data store queue" can include a data value or set of data values stored in a memory, wherein the data value is write-accessible by a set of one or more functions, programs, entities, or the like. The write-accessibility of the data store queue can be policed or otherwise regulated by digital security mechanisms understood by those skilled in the art. Additionally, a data store queue can include only a single function, program, or entity having read-access to read, view, or otherwise receive the data in a unidirectional relationship. In non-limiting examples, this read operation can be "one-time" or destructive (e.g. removing the data after the access operation).

Reference now will be made in detail to aspects of the disclosure, one or more non-limiting examples of which are illustrated in the Figures. Each example is provided by way of explanation of the disclosure, not limitation of the disclosure. In fact, it will be apparent to those skilled in the art that various modifications and variations can be made in the present disclosure without departing from the scope or spirit of the disclosure. Thus, it is intended that the present disclosure covers such modifications and variations as come within the scope of the appended claims and their equivalents.

Although example aspects of the present disclosure are discussed with reference to avionics systems, the subject matter described herein can be used with or applied to internal data of other systems, vehicles, machines, industrial or mechanical assets, or components without deviating from the scope of the present disclosure.

The exemplary drawings are for purposes of illustration only and the dimensions, positions, order and relative sizes reflected in the drawings attached hereto can vary.

Referring now to FIG. 1, an example aircraft 10 is shown having a fuselage and at least one turbine engine, shown as a left engine system 12 and a right engine system 14. The left and right engine systems 12, 14 may be substantially identical. While turbine engines 12, 14 are illustrated, the aircraft 10 may include fewer or additional engine systems, or alternative propulsion engine systems, such as propeller-based engines.

The aircraft 10 is shown further comprising a plurality of sensors, systems, and components, collectively referred to as Line-Replaceable Units (LRUs) 16, 18, and at least one server 20 or computing unit, shown as two flight management systems, or flight control computers, located proximate to each other, near the nose of the aircraft 10. At least one of the servers 20 may further include memory.

The LRUs 16, 18 and servers 20 may be communicatively interconnected by transmission or communication lines defining a data communication mechanism, such as a communications network 22, traversing at least a portion of the aircraft 10. Additional LRUs 16, 18 can be included. While a server 20 is described, aspects of the disclosure can include any computing system, flight computer, or display system displaying data from multiple systems.

The memory of the servers 20 can include Random Access Memory (RAM), flash memory, or one or more different types of portable electronic memory, etc., or any suitable combination of these types of memory. The LRUs 16, 18 or servers 20 may be operably coupled with the memory such that the LRUs 16, 18 or servers 20, or any computer programs or processes thereon, may access at least a portion of the memory (e.g. "shared memory").

The aircraft 10 shown in FIG. 1 is merely a schematic representation of one non-limiting example environment of the disclosure, and used to illustrate that a plurality of LRUs 16, 18 and servers 20 may be located throughout the aircraft 10. The exact location of the LRUs 16, 18 and servers 20 are not germane to the aspects of the disclosure. Additionally, more or fewer LRUs 16, 18 or servers 20 may be included in aspects of the disclosure.

The communications network 22 is illustrated schematically as a bus, but may include a number of data communication connectors and interfaces, for example, Ethernet or fiber optic cables, and routing or switching components, to facilitate the communicative interconnection between the LRUs 16, 18 and servers 20. Furthermore, the configuration and operation of the communications network 22 may be defined by a common set of standards or regulations applicable to particular aircraft environments. For example, the communications network 22 on an aircraft 10 may be defined by, or configured according to, the ARINC 664 (A664) standard, ARINC 429 (A429) standard, or ARINC 653 (A653) standard.

Figure 2:
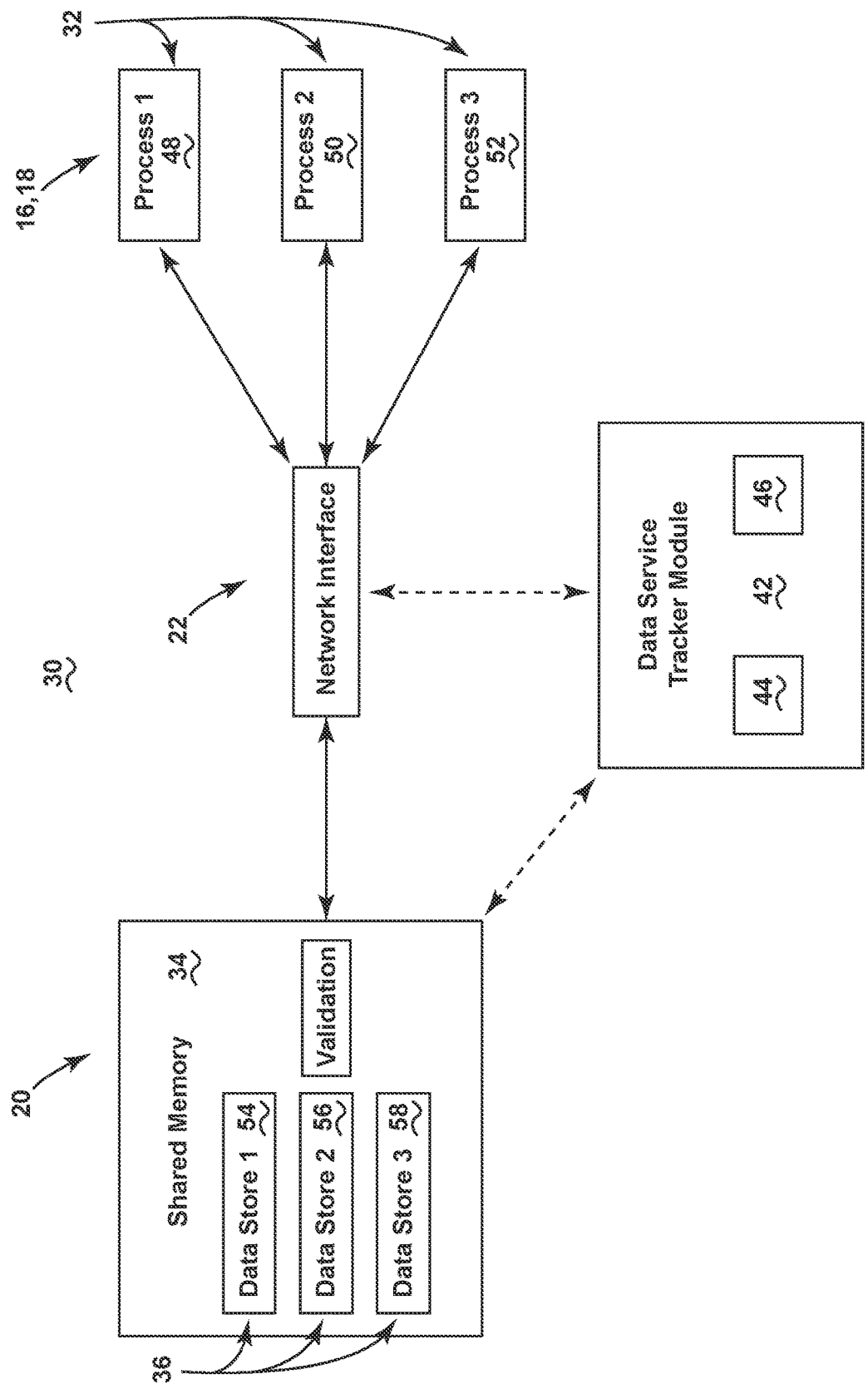
FIG. 2 is a schematic view of a communication system having a set of processes and a shared memory, in accordance with various aspects described herein.

FIG. 2 illustrates a schematic view of a communication system 30 having a set of processes 32 and a shared memory 34, in accordance with various aspects described herein. While a set of processes 32 is shown, the set of processes 32 can include independent data network entities, including but not limited to the LRUs 16, 18. Additionally, the set of processes 32 can include readers entities or processes, writer entities or processes, or a reader and writer entity or process (i.e. a "reader/writer"). The shared memory 34 can include a set of data stores 36, each designated, assigned, or otherwise accounted for storing a particular set of data or data value(s). The shared memory 34 can further include a validation module 38 operably configured to regulate read access, write access, or a combination thereof, to the set of data stores 36. Aspects of the validation module 38 can include authorizing or otherwise validating "authorized" access based on predetermined authorization lists or "approved" entities for particular access, cryptographically secured access (e.g. access enable by or authorized by way of codes, digital signatures, or the like), or another mechanism understood by one skilled in the art. In contrast, to "authorized" access or transactions, "unauthorized" access or transactions can include transaction requests that are denied, not committed to memory, or otherwise not validated by the validation module 38, and whose transaction requests are not carried out by the communication system 30. While a shared memory 34 is shown, the shared memory 34 can include independent data network entities, including but not limited to the server 20.

The set of processes 32 can be communicatively connected with the shared memory 34 of the communication system 30 by way of a network interface 40, including but not limited to the communications network 22. Non-limiting aspects of the network interface 40 can include a network mesh, wired or wireless communication interfaces, communicative signal conductors (such as the transmission lines of the communications network 22), network switches, data routers or routing mechanisms, or the like.

The communications system 30 is further shown including a data service tracker module 42. The data service tracker module 42 can further include memory, shown as a first memory 44 and a second memory 46. As shown, the data service tracker module 42 can be optionally communicatively connected with at least one of, or both of, the shared memory 34 and the network interface 40. For example, the set of processes 32 can include a first process 48 or LRU 16, 18, such as an airspeed sensor, a second process 50 or LRU 16, 18, such as an avionics flight computer, and a third process 52 or LRU 16, 18, such as a navigational component. Similarly, in one non-limiting example, the shared memory 34 can include a first data store 54 representative of an airspeed value stored in a predetermined memory location of the shared memory, a second data store 56, and a third data store 58.

During operation of the communication system 30, the aircraft 10, or the like, the first process 48 or airspeed sensor can sense or measure an airspeed. In response to sensing the airspeed, the first process 48 can be controllably operated to transmit, communicate, or otherwise convey the airspeed, or a value representative of the airspeed, to a predetermined memory storage location of the shared memory 34, such as the first data store 54, for storing the sensed airspeed value. The sensed airspeed value can be communicated by way of the network interface 40 or communications network 22 to the shared memory, where, for example, the validation module 38 ensures, approves, or otherwise validates that the first process 48 is authorized to write or commit the sensed airspeed value to the first data store 54. In another non-limiting example, the validation module 38 can be communicatively connected with the data service tracker module 42, for example by way of an interface, and can determine whether the desired transaction communication is determined to be authorized or unauthorized, and can report that determination to the data service tracker module 42.

In another instance of the communication system 30, the second process 50, such as the avionics flight computer can read, request, or otherwise demand the sensed airspeed value stored in the first data store 54. For instance, the second process 50, can actively request read access of the data stored in the first data store 54, and the read access of the shared memory 34 by the second process 50 can be validated or otherwise confirmed by the validation module 38. In this instance, both the request and the resulting communication of the data stored in the first data store 54 can be delivered from or to the second process 50 by way of the network interface 40 or the communications network 22.

In another non-limiting example, the second process 50 alternatively or additionally receive the data stored in the first data store 54 by way of an unprompted or "triggerless" communication, just as a communication based on a schedule, periodic transmissions, or the like. In this sense, the second process 50 can still receive access to the data of the first data store 54, such as read-access, but without having to make a "request" for the data. Furthermore, aspects of the disclosure can be included wherein the second process 50 can further be enabled or authorized to return a data value related to the airspeed (i.e. a second data value), or a derivative thereof, and save that second data value to the first data store 54, or another data store 56, 58, in accordance with authorizing storing values, as described herein. In this sense, the second process 50 can be adapted or configured for both read access and write access to the same, or different data stores 54, 56, 58 of the shared memory 34.

Aspects of the communications system 30 can be included wherein the data service tracker module 42 is configured, adapted, or otherwise operably enabled to identify, track, manage, or associate connections, communications, to data access between entities accessing the shared memory 34, including, but not limited to the set of processes 32. For instance, the data service tracker module 42 can be communicatively connected with either of, or both of, the network interface 40 or the shared memory 34. When a communication, a request, a demand, or a transaction for accessing (e.g. either reading or writing to) the shared memory 34 is communicated, the data service tracker module 42 can receive, record, or otherwise log aspects of the communication.

Aspects of the transaction communication can further include identifying aspects of data thereof, including, but not limited to, the sending source or transaction source (e.g. one of the set of processes 32, or in some instances, the shared memory 34, if initiating sending data store data to the set of processes 32), the destination receiver or transaction destination (e.g. the shared memory 34, or a particular shared memory 34 or server 20 in a group of shared memories 34 or servers 20, or in some instances, the set of processes 32), or even the particular memory being accessed (e.g. which of the one or more of the set of data stores 36). These aspects of the transaction communication can include, but not limited to, transaction communication data, or data related to the transaction communication, itself. The data service tracker module 42 can be adapted or configured to identify aspects of the transaction communication by receiving and interpreting, utilizing, parsing, or otherwise identifying sub-portions of the communication itself, such as network addresses, data header information, frame information, payload information, or the like. In another non-limiting example, the data service tracker module 42 can be adapted or configured to further identify timing-based aspects of the transaction communication, such as timestamps, or the like. In one non-limiting instance, the data service tracker module 42 can be adapted or configured to perform the actions described herein by way of a controller module (not shown). This example can include origination timing aspects, destination timing aspects, response timing aspects, or a combination thereof. Non-limiting aspects of the timing, such as a timestamp, can be based upon the transaction communication itself (e.g. a timestamp in the communication data header), or based on an independent clock residing or otherwise originating at the data service tracker module 42. In this non-limiting example, the set of data couplings can further include the timestamp of the transaction communication data.

In one non-limiting aspect, at least a portion of the transaction communication can be received by way of an optional connection with the network interface 40, such at each transaction communication traversing the network interface 40 can be received by the data service tracker module 42. In another non-limiting aspect, at least a portion of the transaction communication can be received by way of an optional connection with the shared memory 34, for example, by way of an interface that identifies or otherwise communicates read and write transactions of the shared memory 34, or a data store 54, 56, 58 thereof. In one example, the validation module 38 can be utilized for identifying or otherwise communicating the read and write transactions, if or when the validation module 38 authorizes or validates the transaction access. In yet another non-limiting aspect of the disclosure, the data service tracker module 42 can optionally be communicatively connected with both of the shared memory 34 and the network interface 40, and receive transaction communication aspects from each.

The data service tracker module 42, in response to receiving a set of transaction communications, can in turn build a set of data couplings of the communications system based on the set of transaction communications. The set of data couplings can identify known or determined couplings between a sending source and a receiving source, and can be further stored in one of the memories 44, 46 of the data service tracker module 42. As explained, the data source can be an originating requestor of a data store 36 access request, such as one of the set of processes 32, the shared memory 34, the validation module 38, or the like. Similarly, the receiving source can be a destination of where a data store 36 access request is receiving, such as one of the set of processes 32, the shared memory 34, the validation module 38, or the respective data store 36, itself. In this sense, the data service tracker module 42 can build a set of data couples, a table, a database, or the like, defining a set of known or valid data access interaction. In one non-limiting example, the set of data couples can include recording at least a transaction source and a transaction destination of the transaction communication.

In one non-limiting example based on an earlier-described transaction, the data service tracker module 42 can record, identify, store, or otherwise generate a data couple entry defining the first process 48 and the first data store 54 are associated. This association can include timestamps or timing aspects of the transaction or transaction communication(s) during operations of the communications system 30, including, but not limited to, that the first process's 48 access to the first data store 54 includes write-access, that the access is or is not validated by the validation module 38, whether the access or transaction completes successfully, the like, or a combination thereof. In another non-limiting example aspects of the data coupling can further include data representative of the data coupling, access, or the like, including but not limited to a coupling state (e.g. active or inactive), a cryptographic hashing representative of one of more data couplings or a subportion of the coupling thereof, or the like.

Similarly, in another non-limiting example based on an earlier-described transaction, the data service tracker module 42 can record, identify, store, or otherwise generate a data couple entry defining the second process 50 and the first data store 54 are associated with read-access, that the second process 50 is associated with the first data store 54 (or another data store 56, 58) by way of write-access, or the like. In this example, a single data coupling entry in memory 44, 46 representative of an association between the first data store 54 and the second process 50 can include both read-access and write-access couplings. In another example, a unique data coupling entry in memory 44, 46 can be representative of a single association between the first data store 54 and the second process 50, such as a first entry representative of the read-access by the second process 50 and a second entry representative of the write-access by the second process 50. In yet another non-limiting example, a transaction communication originated by the shared memory 34 or validation module 38, or the like, between the first data store 54 to the second process 50 can further include a separate or unique data coupling entry in memory 44, 46 of the data service tracker module 42, as the origination source or the destination receiver are opposite, compared with an access transaction originating for the second process 50.

Thus, aspects of the disclosure can be included wherein the communication system 30 includes a data service tracker module 42 that can generate, build, identify, log, or otherwise record a set of data couplings based on access transactions occurring through the communications system 30. In this sense, non-limiting aspects of the disclosure can be used, included, or otherwise utilized to generate or build a list of entities that request access, validate access, publish data, subscribe to data, or otherwise interact with data stored in a shared memory 34. This list of entities interacting with data stored in a shared memory 34 can be further utilized to, for example, validate communication system operations, ensure access to the shared memory 34 is operating as intended or designed, identify possible errors in access or attempted access of shared memory components, or the like. In another non-limiting example, the set or list of data coupling entries can further be utilized to recreate or demonstrate an ordered list of shared memory 34 access, for example, by way of the timing aspects of the data coupling, as described herein.

In some communication systems 30, including those in avionics systems or aircraft, it can be difficult to discern what entities, processes, or the like, exist on or as a node of the communication system 30, and have or lack memory access to shared memory 34. It can further be difficult to ensure or monitor shared memory 34 access during testing, prototyping, or in-situ operation of the communication system 30. The technical effect of aspects of the disclosure can include providing or enabling the data service tracker module 42 to identify and record data couplings between endpoints, as described herein. Furthermore, the technical effect of aspects of the disclosure can further include operating the data service tracker module 42 during real-time or run-time of the communications system, building or generating the set of data coupling entries at the time of access with the shared memory 34.

Non-limiting aspects of the disclosure can be included wherein, for example different data coupling entries, or different portions of individual data coupling entries can be stored in one or more memory 44, 46 portions of the data service tracker module 42. In another non-limiting example, the data coupling entries can further be searchable in order to ascertain or validate programming, authorized access, timing windows, or source or destination entries, by way of any of the aforementioned recorded transaction communication aspects. In yet another non-limiting example, a coupling between endpoints can be established, tracked, recorded, or the like, only after a particular occurrence of events, such as a particular sequence of events. For instance, in one non-limiting example, a coupling can be tracked after exercising an ordered tracking of a write access by the transaction source, followed by a read access by the transaction source or the transaction destination. Additional ordered events or sequences of events are envisioned to established a coupling.

Figure 3:
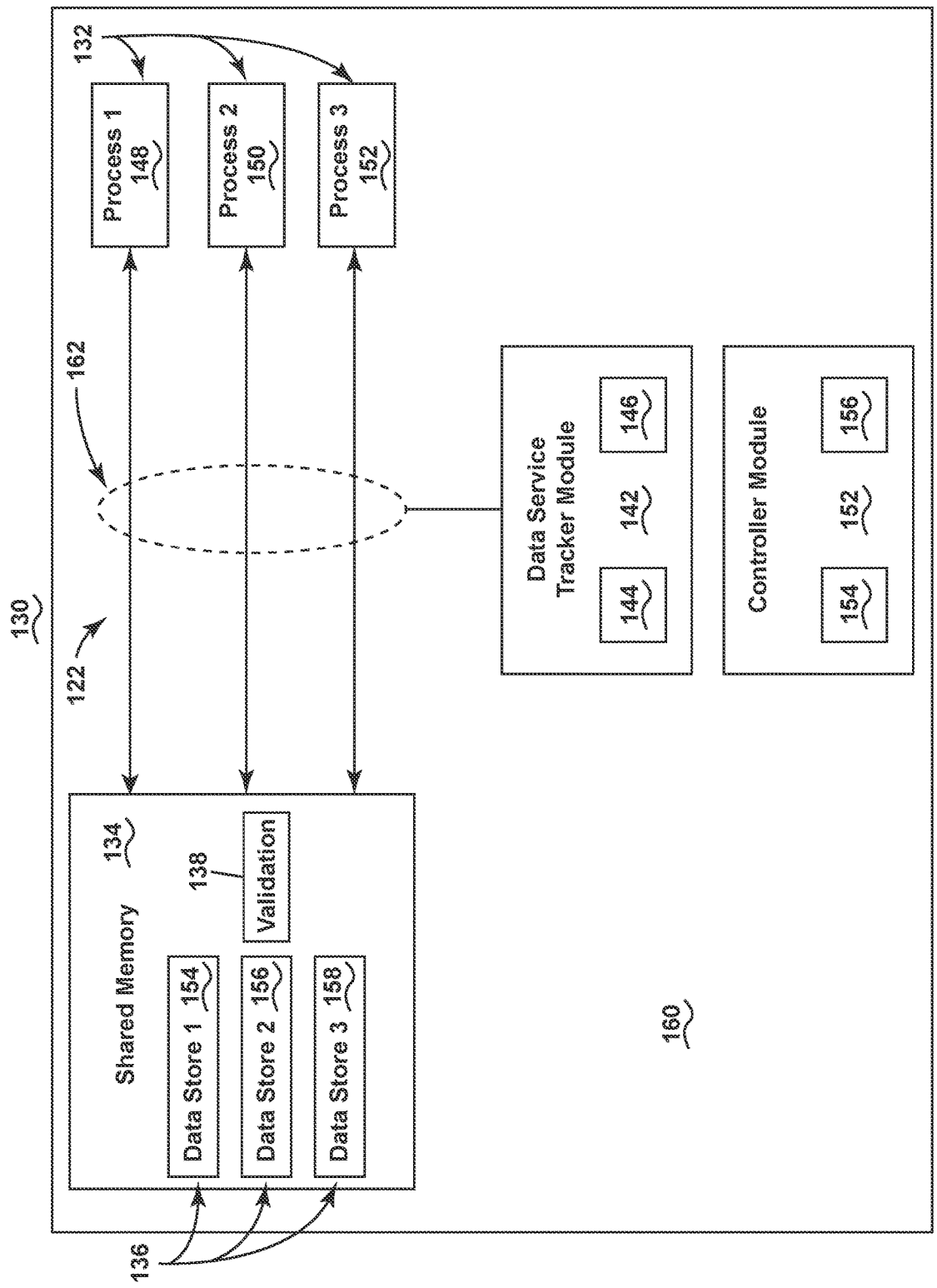
FIG. 3 is a schematic view of communication within a system having a set of processes and a shared memory, in accordance with various aspects described herein.

FIG. 3 illustrates another communication system 130 according to another aspect of the present disclosure. The communication system 130 is similar to the communication system 30; therefore, like parts will be identified with like numerals increased by 100, with it being understood that the description of the like parts of the communication system 30 applies to the communication system 130, unless otherwise noted. One difference is that the communication system 130 of FIG. 3 can include communication within a contained system 160, such as a single computer, operating system, node, system partition, or the like. In contrast, the communication system 30 included independent data network entities, as described.

As shown, the communication system 130 can include the shared memory 134, the set of data stores 136, 154, 156, 158, and the validation module 138, similar to the previously described components. One difference is the components 134, 136, 138, 154, 156, 158 are contained, stored within, or otherwise a subcomponent of the contained system 160, as opposed to another network node, such as the server 20. In non-limiting examples, this can include aspects wherein the shared memory is only accessible within the contained system 160. The communication system 130 is also shown including the set of processes 132, 148, 150, 152, which, for example, can be processes 132, 148, 150, 152 only utilized by the contained system 160. In non-limiting examples, aspects of the set of processes 132, 148, 150, 152, the shared memory 134 (or subcomponents 136, 138, 154, 156, 158 thereof), can be operably enabled by way of a controller module 152, as described herein, having a processor 154 and memory 156 for executing or otherwise operably enabling the set of processes 132, shared memory 134 access, or a subset thereof.

The communication system 130 further includes a data service tracker module 142 and can further include memory, shown including a first memory 144 and a second memory 146. The data service tracker module 142 can be optionally communicatively connected with at least one of, or both of, the shared memory 134, the set of processes 132, or a combination or subset thereof. For instance, the set of processes 132 can be operably connected with the shared memory 134 by way of communication system 130 or contained system 160 mechanisms to enable communication, including, but not limited to, application programmable interfaces (APIs), system calls, programming library calls, or the like, collectively defined as communication mechanisms 122. In non-limiting aspects of the disclosure, the data service tracker module 142 can be enabled or operably adapted to note, detect, view, record, track, or otherwise determine when the communication mechanisms 122 transmit, communicate, or otherwise convey shared memory 134 transactions utilized within the contained system 160, as described herein. The detection is schematically illustrated by dotted loop 162, encompassing the communication mechanisms 122 between the set of processes 132 and the shared memory 134.

As described herein, during operation the data service tracker module 142 can be adapted, configured, or operably enabled to identify, track, manage, or associate connections, communications, to data access between entities accessing the shared memory 134, including, but not limited to the set of processes 132. When a communication, a request, a demand, or a transaction for accessing (e.g. either reading or writing to) the shared memory 134 is communicated by way of the communication mechanisms 122, the data service tracker module 142 can receive, record, or otherwise log aspects of the transaction communication, for example based on the validation module 138, triggerless communication, or the like. Aspects of the transaction communication can further include identifying aspects as described herein, and can further in turn, build a set of data couples based on the set of transaction communication, as described herein.

Thus, aspects of the disclosure can be included wherein the communication system 130 includes a data service tracker module 142 that can generate, build, identify, log, or otherwise record a set of data couplings based on access transactions occurring through the communications system 130. In this sense, non-limiting aspects of the disclosure can be used, included, or otherwise utilized to generate or build a list of entities that request access, validate access, publish data, subscribe to data, or otherwise interact with data stored in a shared memory 134. This list of entities interacting with data stored in a shared memory 134 can be further utilized to, for example, validate communication system operations, ensure access to the shared memory 134 is operating as intended or designed, identify possible errors in access or attempted access of shared memory components, or the like.

In another non-limiting example, the set or list of data coupling entries can further be utilized to recreate or demonstrate an ordered list of shared memory 134 access, for example, by way of the timing aspects of the data coupling, as described herein.

Figure 4:
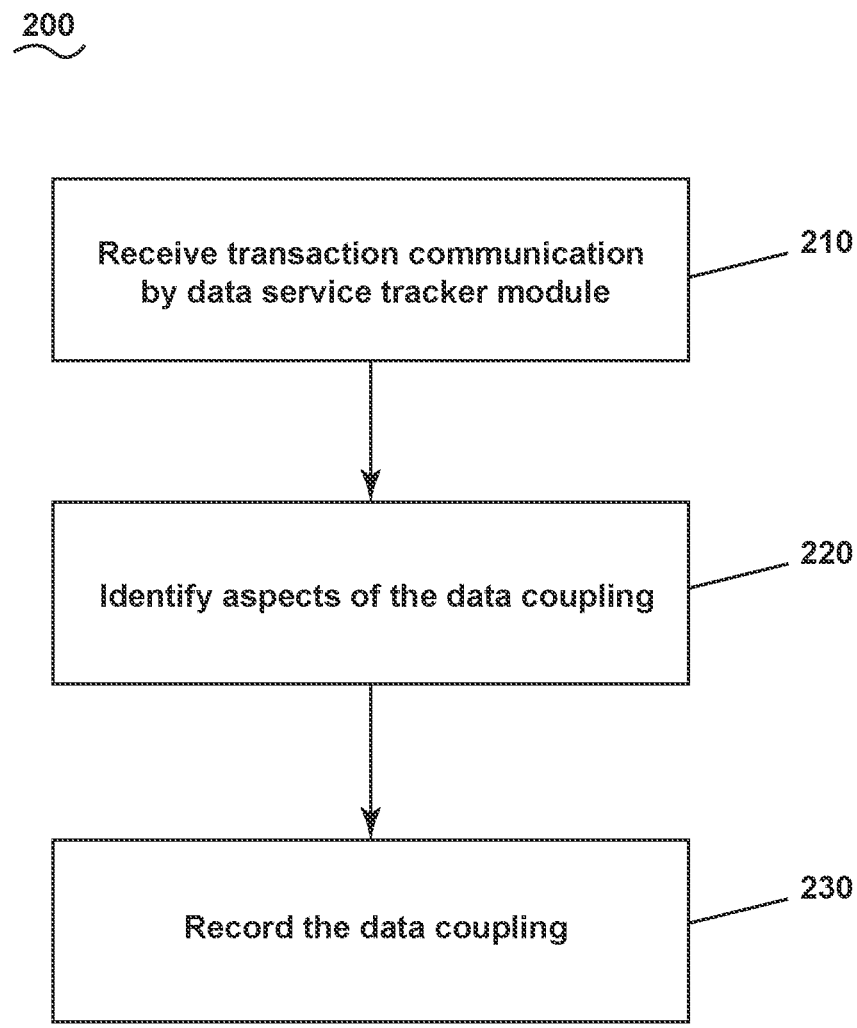
FIG. 4 is an example flow chart diagram of demonstrating a method of determining a set of data couplings, in accordance with various aspects described herein.

FIG. 4 illustrates a flow chart demonstrating a method 200 of a method of determining a set of data couplings, in accordance with various aspects described herein. The method 200 begins by receiving data transaction communications by a data service tracker module 42, 142, at 210. The method 200 continues by identifying aspects of the data coupling, by the data service tracker module 42, 142, at 220. As described herein, the identifying of aspects of the data coupling can include source information, destination information, validation information, or the like. The method 200 then continues to recording aspects of the data coupling in memory 44, 46, 144, 146, for example, to build or define a set of data couplings describing, for example, publish-subscriber data coupling pairs, authorized readers, authorized writers, or the like.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. For example, non-limiting aspects of the disclosure can be included wherein the data service tracking module 42, 142 can be selectively enabled or disabled, as needed. For example, the data service tracking module 42, 142 can be enabled during testing, development, and the like, and can then be disabled during production or installation of the communication system 30, 130 in-situ. In another non-limiting example, the data service tracking module 42, 142 can be selectively enable during regression testing, upgrade testing, or fault analysis of in-situ communication system 30, 130, and then again disabled at a later time.

The aspects disclosed herein provide a communication system for defining a set of data couplings by a data service tracker module 42, 142. The technical effect is that the above described aspects enable the defining or generation of a set of data coupling pairs, data, or the like, defining communication transactions between a first and a second entity, component, or the like. One advantage that can be realized in the above aspects is that the above described enable a defined set of data coupling pairs, enabling definition and awareness of all data coupling pairs of a communication system 30, 130, developed or defined by the operation of the communication system 30, 130, without awareness or defined knowledge of the communication system 30, 130, or predefined knowledge of authorized data couplings. Utilizing aspects of the disclosure, the coupling state of the identified or defined list of data coupling pairs can then be tracked, for example, to ensure proper or expected operation of the data coupling pairs, including whether the coupling state between pairs has been exercised or not exercised, data coupling tracking, inspection of time-stamped transactions, or the like. Furthermore, these aspects can be utilized during design, prototyping, and verification of communication systems 30, 130, including comparison of the set of data couplings with expect communications or transaction communications, as desired or designed.

Another advantage to aspects described herein can include solving an issue where the data couplings, are generally unknown. For example, having no knowledge of what data objects exists, less than full knowledge of what data objects exists, partial knowledge of what data objects exists, or in environments where it would otherwise be difficult to obtain the knowledge of what data objects exists, incomplete knowledge of what data objects exists, or a delayed or inefficiency in determining knowledge of what data objects exists, or having no mechanism for monitoring memory access (e.g. read or write), can lead to delays in troubleshooting, coding, developing, or fault analysis for system implementation. Furthermore, by developing the set of data couplings during real-time operation of the communication system 30, 130, a low-overhead and lower-effort tracking and verification of memory access can be accomplished or achieved.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A data service tracker module for a communication system, comprising an interface with a communication mechanism operable to receive transaction communication data between a transaction source and a transaction destination, and a controller module, configured to receive the transaction communication data, identify transaction communication aspects of the transaction communication data, including at least the transaction source and the transaction destination, and build a set of data couplings of the communication system, each data coupling defining the transaction source and the transaction destination.

The data service tracker module of any preceding clause, wherein the controller module is further configured to identify transaction communication aspects by at interpreting or parsing the transaction communication data.

The data service tracker module of any preceding clause, wherein the controller module is configured to build the set of data couplings utilizing at least a one of a network address, communication transaction data header information, communication transaction data frame information, or communication transaction payload information.

The data service tracker module of any preceding clause wherein the controller module is further configured to identify whether the transaction communication aspects include one of an authorized transaction communication or an unauthorized transaction communication.

The data service tracker module of any preceding clause, further comprising a second interface with a validation module configured to determine whether the transaction communication data is an authorized transaction communication or an unauthorized transaction communication, and communicates the determination to the controller module.

The data service tracker module of any preceding clause wherein the controller module is further configured to timestamp the transaction communication data, and build the set of data couplings, each data coupling further defining the timestamp of the transaction communication data.

The data service tracker module of any preceding clause wherein the communication mechanism is a network interface interconnecting a set of a transaction sources with a set of transaction destinations.

The data service tracker module of any preceding clause wherein the communication mechanism is one of an application programmable interface, a system call, or a programming library call.

A communication system, comprising a shared memory defining at least one data store, a process having access to the at least one data store by way of a communication mechanism, a data service tracker module communicatively connected with the communication mechanism, and configured to identify access between the at least one data store and the process, by way of the communication mechanism, and to record transaction communication data related to the access, including at least an access initiator and an access type, to build a set of data couplings between the shared memory and the process.

The communication system of any preceding clause, further comprising a set of processes and a set of data stores, each of the set of processes having access to at least of one the set of data stores, and wherein the data service tracker module is configured to build a set of data couplings by way of identifying and recording transaction communication data related to each access between the set of processes and the set of data stores.

The communication system of any preceding clause, wherein the access type can include one of read access, write access, or read and write access.

The communication system of any preceding clause, further comprising a validation module configured to enforce a predetermined access type for each access between the at least one data store and the process.

The communication system of any preceding clause wherein the transaction communication data includes at least a subset of a network address, communication transaction data header information, communication transaction data frame information, or communication transaction payload information.

The communication system of any preceding clause wherein the data service tracker module is configured to build the set of all data couplings between the shared memory and the process during run-time of the communication system, without knowledge of predetermined data couplings of the communication system.

The communication system of any preceding clause wherein the communication mechanism is one of an application programmable interface, a system call, or a programming library call.

A method of determining a set of data couplings in a communication system, the method comprising receiving, in real-time, by a data service tracker module, a transaction communication, from a communication mechanism, the transaction communication defining access between a transaction source and a transaction destination identifying aspects of the transaction communication, by the data service tracker module, to define transaction communication data defining a data coupling between the transaction source and the transaction destination, and recording the transaction communication data defining the data coupling, by the data service tracker module, to define a set of data couplings authorized for transaction communications in the communication system.

The method of any preceding clause, further comprising comparing the set of data couplings authorized for transaction communications with a predetermined set of desired data couplings authorized for transaction communications.

The method of any preceding clause, further comprising identifying a real-time timestamp of the transaction communication, and recording the timestamp in the transaction communication data.

The method of any preceding clause wherein the data service tracker module lacks knowledge of predetermined data couplings of the communication system, and wherein the recording the transaction communication data builds in real-time, the set of data couplings authorized for transaction communications in the communication system.

The method of any preceding clause, further comprising comparing the set of data couplings authorized for transaction communications with an expected set of desired data couplings authorized for transaction communications.

What is claimed is:

1. A data service tracker module for an aircraft communication system, comprising:
   an interface with a communication mechanism operable to receive regulated transaction communication data between a transaction source and a transaction destination of the aircraft communication system, and wherein the transaction destination having a shared memory defining a set of data stores; and
   a controller module configured to:
      receive, during a testing operation of the regulated transaction communication data, real-time transaction communications defining access between a transaction source and a transaction destination, the transaction destination having a shared memory defining a set of data stores;
      identify transaction communication aspects of the transaction communication data, defining a data coupling between at least the transaction source and at least one of the set of data stores of the shared memory;
      build a set of data couplings of the aircraft communication system, each data coupling defines the transaction source and the at least one of the set of data stores of the shared memory;
      compare the set of data couplings with a predetermined expected set of data couplings;
      determine, based on the comparison, that the aircraft communication system is operating in accordance with a predetermined expected set of data couplings; and
      validate the testing operation of the aircraft communication system completed successfully.

2. The data service tracker module of claim 1, wherein the data service tracker module can be at least one of selectively enabled or selectively disabled during operation of the aircraft communication system.

3. The data service tracker module of claim 2, wherein the data service tracker module is enabled during at least one of testing, development, regression testing, or fault analysis testing of the aircraft communication system.

4. The data service tracker module of claim 3, wherein the data service tracker module is disabled at a conclusion of the at least one of testing, development, regression testing, or fault analysis testing of the aircraft communication system.

5. The data service tracker module of claim 1, wherein the controller module is further configured to compare the built set of data couplings with a predetermined expected operation of data couplings to validate the aircraft communication system is operating as designed.

6. The data service tracker module of claim 5, wherein the controller module is further configured to compare the built set of data couplings with a predetermined expected operation of data couplings to determine whether each data coupling of the predetermined expected operation of data couplings has been exercised or not exercised.

7. The data service tracker module of claim 1 wherein the aircraft communication system is an ARINC standard communication system.

8. A data service tracker module for testing an aircraft communication system, comprising:
   an interface with a communication mechanism operable to receive regulated transaction communication data between a transaction source and a transaction destination of the communication system, and wherein the transaction destination having a shared memory defining a set of data stores; and
   a controller module configured to receive, during a testing operation of the regulated transaction communication data, real-time transaction communications defining access between a transaction source and a transaction destination, the transaction destination having a shared memory defining a set of data stores, identify transaction communication aspects of the transaction communication data, defining a data coupling between at least the transaction source and at least one of the set of data stores of the shared memory, build a set of data couplings of the communication system, each data coupling defines the transaction source and the at least one of the set of data stores of the shared memory, compare the built set of data couplings with a predetermined set of design criteria including at least an expected set of data couplings, determine, based on the comparison, that the aircraft communication system is operating in accordance with the expected set of data couplings, and record the aircraft communication system is operating in accordance with the predetermined set of design criteria.

9. The data service tracker module of claim 8, wherein the data service tracker module can be at least one of selectively enabled or selectively disabled during operation of the aircraft communication system.

10. The data service tracker module of claim 9, wherein the data service tracker module is enabled during at least one of development, regression testing, or fault analysis testing of the aircraft communication system.

11. The data service tracker module of claim 10, wherein the data service tracker module is disabled at a conclusion of the at least one of development, regression testing, or fault analysis testing of the aircraft communication system.

12. The data service tracker module of claim 8, wherein the controller module is further configured to validate the aircraft communication system is operating as designed.

13. The data service tracker module of claim 12, wherein the controller module is further configured to compare the built set of data couplings with a predetermined expected operation of data couplings to determine whether each data coupling of the predetermined expected operation of data couplings has been exercised or not exercised.

14. The data service tracker module of claim 8 wherein the aircraft communication system is an ARINC standard communication system.

15. The data service tracker module of claim 8 wherein the controller module is further configured to identify whether the transaction communication aspects include one of an authorized transaction communication or an unauthorized transaction communication.

16. A method of testing a set of data couplings in a regulated communication system for an aircraft, the method comprising:

receiving, during testing of the regulated communication system, by a data service tracker module, real-time transaction communications defining access between a transaction source and a transaction destination, the transaction destination having a shared memory defining a set of data stores;

identifying aspects of the transaction communication, by the data service tracker module, to define transaction communication data defining a data coupling between the transaction source and at least one of the set of data stores of the shared memory;

recording the transaction communication data defining the data coupling, by the data service tracker module, to define a set of data couplings authorized for transaction communications in the regulated communication system;

comparing the defined set of data couplings with a predetermined expected set of data couplings; and determining, based on the comparison, that the regulated communication system passes the test by operating in accordance with a predetermined expected set of data couplings;

wherein the transaction source and the transaction destination are within the regulated communication system.

17. The method of claim 16 wherein the data service tracker module lacks knowledge of predetermined data couplings of the regulated communication system, and wherein the recording the transaction communication data builds in real-time, the set of data couplings authorized for transaction communications in the regulated communication system.

18. The method of claim 16, further comprising at least one of selectively enabling or selectively disabling the data service tracker module during operation of the regulated communication system.

19. The method of claim 18, further comprising enabling the data service tracker module during at least one of development, regression testing, or fault analysis testing of the regulated communication system.

20. The method of claim 19, further comprising disabling the data service tracker module at a conclusion of the at least one of development, regression testing, or fault analysis testing of the aircraft communication system.

* * * * *